United States Patent
Ems

[11] Patent Number: 5,434,552
[45] Date of Patent: Jul. 18, 1995

[54] TRAILER HITCH SECURITY SYSTEM WITH SEPARATE AND SELECTIVELY SET LOOSE CONNECTION AND THEFT PREVENTION ALARMS

[76] Inventor: Glenn L. Ems, R.R.#1, Box 770, Rogers, Ark. 72756

[21] Appl. No.: 185,043
[22] Filed: Jan. 24, 1994
[51] Int. Cl.⁶ ............................................. G08B 21/00
[52] U.S. Cl. ................................. 340/431; 340/687; 280/432; 280/511
[58] Field of Search .............. 340/431, 438, 426, 687, 340/686; 280/432, 477, 507, 511; 200/61.44

[56] References Cited
U.S. PATENT DOCUMENTS

| | | | |
|---|---|---|---|
| 2,564,520 | 8/1951 | Blasdell | 340/431 |
| 3,710,370 | 1/1973 | Quilici et al. | 340/431 |
| 4,430,637 | 2/1984 | Koch-Dücker et al. | 340/431 |
| 4,593,264 | 6/1986 | Engle | 340/431 |
| 4,627,633 | 12/1986 | Gehman et al. | 280/432 |
| 5,028,907 | 7/1991 | Windeler | 340/438 |
| 5,159,312 | 10/1992 | Engle | 340/431 |

Primary Examiner—Jeffrey A. Hofsass
Attorney, Agent, or Firm—Young & Thompson

[57] ABSTRACT

A trailer hitch security system has a first audible alarm to alert the driver of a towing vehicle of a loose connection with the trailer, and of a loose connection between the ball of the trailer hitch and the towing vehicle's frame. The system also has two visual indicators alerting the driver of the state of the coupling between the trailer and the vehicle. A second audible alarm is automatically activated if the vehicle's ignition is turned off and an unauthorized removal of the trailer is attempted. The second audible alarm is loud and intermittent, thus alerting the driver of unauthorized unhitching, or theft, of the trailer. The loud alarm may be turned off only from within the cab of the vehicle, as returning the trailer to the towing vehicle's ball will not deactivate it. The second audible alarm is tied to a timer which limits the sounding of the second audible alarm to a preset time interval.

12 Claims, 2 Drawing Sheets

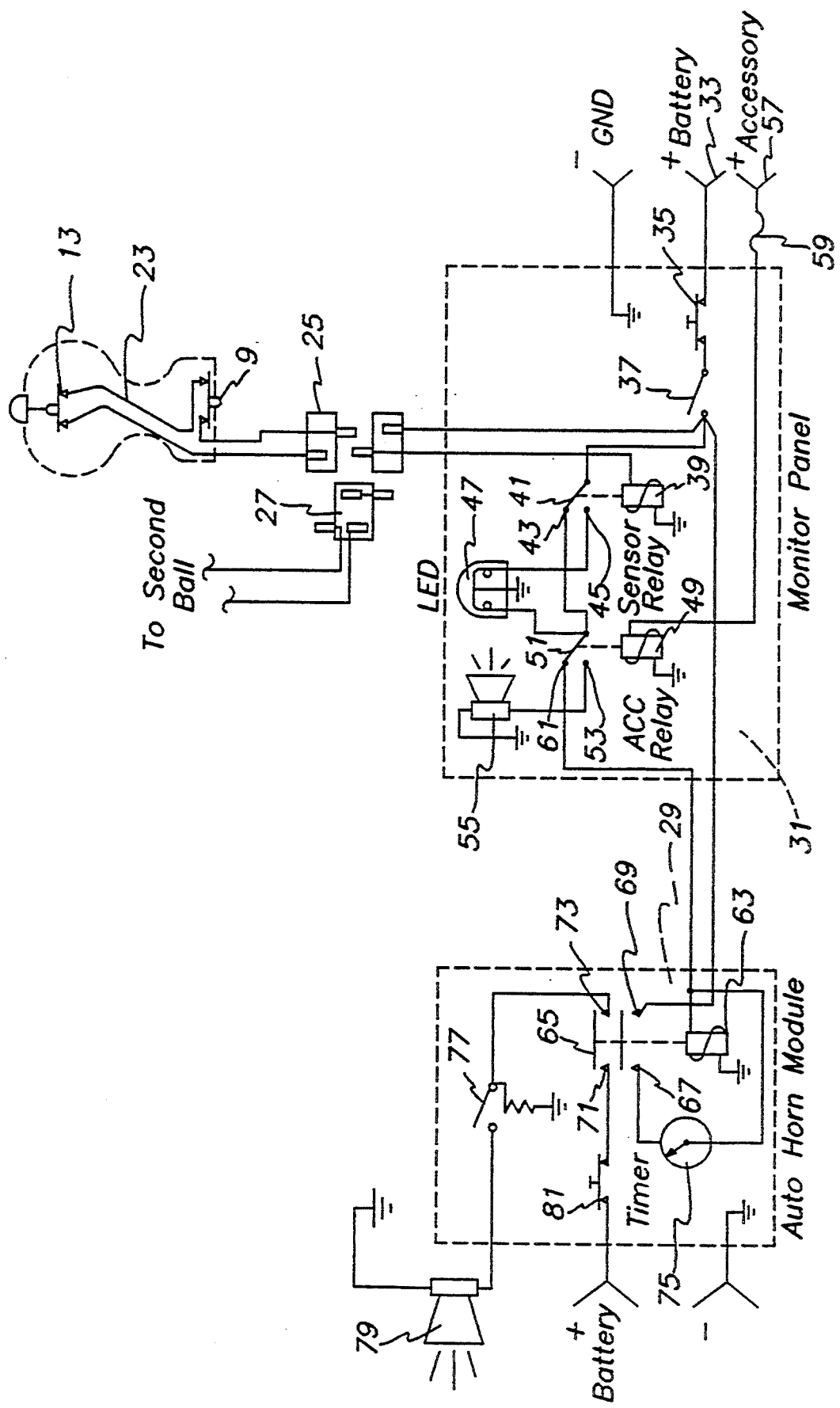

TRAILER HITCH SECURITY SYSTEM WITH SEPARATE AND SELECTIVELY SET LOOSE CONNECTION AND THEFT PREVENTION ALARMS

BACKGROUND OF THE INVENTION

The present invention relates to a security system for trailer hitches, and in particular, to a novel trailer ball connected to a security system having two separate alarms selectively set by the driver, one alarm to signal a loose trailer connection, and the other to alert the driver and those in the vicinity of unauthorized unhitching, or theft, of the trailer.

Conventionally, trailer hitches are of the ball and socket type, which allows a secure connection of a socket coupling member of the trailer to the ball of the towing vehicle. The ball and socket arrangement allows a tight connection of the trailer to the towing vehicle, while allowing the trailer to pivot with respect to the ball, thus permitting the vehicle and the trailer to negotiate turns in the road.

However, vibrations, shock, wear and tear, accumulation of dirt, or improper seating of the trailer ball over the socket may cause the hitch assembly to become loose. This loosening may cause an accidental uncoupling of the trailer socket from the ball of the towing vehicle while the vehicle is in motion, with disastrous results, both in personal injury and property loss. As the hitch assembly is never visible to the driver while the vehicle is in motion, a device to monitor the integrity of the trailer hitch connection from within the cab of the vehicle is needed to assure the safety the driver and to safeguard the trailer. Also needed is a security device to monitor the trailer coupling for unauthorized unhitching or theft of the trailer after the vehicle's ignition has been turned off and to sound a loud alarm if such an unauthorized uncoupling or theft is detected.

Various solutions have been proposed to indicate a secure trailer hitch connection and to alert the driver of the towing vehicle of a loose connection or of theft of the trailer. U.S. Pat. No. 2,564,520 to Biasdell discloses mounting a lamp on the trailed vehicle which is energized when a proper connection is made. U.S. Pat. No. 3,710,370 to Quilici et al. teaches mounting both visual and audio indicators on an automobile's dash board, thus signaling the improper coupling to the driver while the vehicle is in motion. U.S. Pat. No. 4,593,264 to Engle discloses a circuit which actuates a single warning signal (the vehicle's horn) when the ball-socket coupling becomes loose and in the case of an attempted theft of the trailer. Thus, in Engle '264, the vehicle's horn will sound during normal connection and disconnection procedures, as well as when the vehicle is in motion, should the trailer coupling become loose. Sounding the vehicle's horn in the aforementioned circumstances is undesirable, irritating and potentially dangerous. U.S. Pat. No. 4,627,633 to Gehman et al. also discloses a hitch uncouple detecting and signaling apparatus, but does not, however, disclose a trailer theft alarm means. A later patent to Engle, U.S. Pat. No. 5,159,312, provides for a double switch system wherein a signal is provided upon detection of a loose connection of the ball to the socket, as well as upon detection of a loose connection between the ball and the towing vehicle frame structure. A warning is also sounded upon unauthorized removal of the hitch. The alarm signals are transmitted to a receiver, which may be in the cab of the vehicle, or in a remote location.

All of the aforementioned systems use a single alarm, usually the horn of the vehicle, to alert the vehicle's driver to a loose hitch connection or an unauthorized removal of the trailer. Thus, the horn may blast even when the vehicle is in motion, with unpredictable effect upon the driver and surrounding vehicles. Furthermore, none of the solutions proposed above teach any selectivity in the setting of the alarms. The vehicle's operator is therefore not able to selectively set only the loose connection alarm, or only the theft detecting alarm.

OBJECTS OF THE INVENTION

Accordingly, it is an object of the present invention to provide a device having two alarms, one which is a low-key alarm to signal the driver that the trailer connection is loose, and the other a more blatant alarm, such as the existing theft alarm of the vehicle, to signal an attempt at unauthorized removal of the trailer.

It is another object of the present invention to provide visual indicators which assure the driver that the trailer is secure, or which alert the driver of an unsafe connection.

It is a further object of the present invention to provide a device which engages automatically to monitor against theft of the trailer upon switching the vehicle's ignition off.

It is a still further object of the invention to provide a theft monitoring device which, upon unauthorized removal of the trailer socket from the towing vehicle's ball, intermittently sounds a blatant alarm which cannot be deactivated by merely recoupling the trailer and the vehicle.

These and other objects of the invention will become apparent with reference to the following drawings and specifications.

SUMMARY OF THE INVENTION

The foregoing and still further objects are achieved in a trailer hitch security system that includes a single switch to activate the system, a main sensor switch and a loose ball switch on the trailer ball. The trailer alarm system further includes a Driving Mode wherein a green light in the cab of the vehicle indicates that the trailer is secure, and a red light and an intermittent audible alarm, each activated by a separate relay, indicate unsafe coupling conditions. The alarm system according to the invention also includes a Park Mode, or alternatively, a Theft Monitoring Mode, which is automatically activated when the ignition is turned off. In the Theft Monitoring Mode, the vehicle's horn is intermittently activated by the closing of a double-pole, single-throw switch also tied to a timer if an unauthorized unhitching or theft of the vehicle occurs. To deactivate the alarm, the operator must turn the system off from within the cab of the vehicle, as merely returning the trailer to the ball will not de-activate the sounding of the horn. The timer will also shut the theft alarm off after a preset period of time. A separate adaptor plug is provided to allow tandem hauling of two trailers, both of which can be monitored by the trailer hitch security system according to the present invention.

BRIEF DESCRIPTION OF THE DRAWINGS

FIG. 2 is a detailed circuit diagram of the control circuit of the trailer hitch security system according to the present invention.

DETAILED DESCRIPTION OF THE INVENTION

Figure 1:
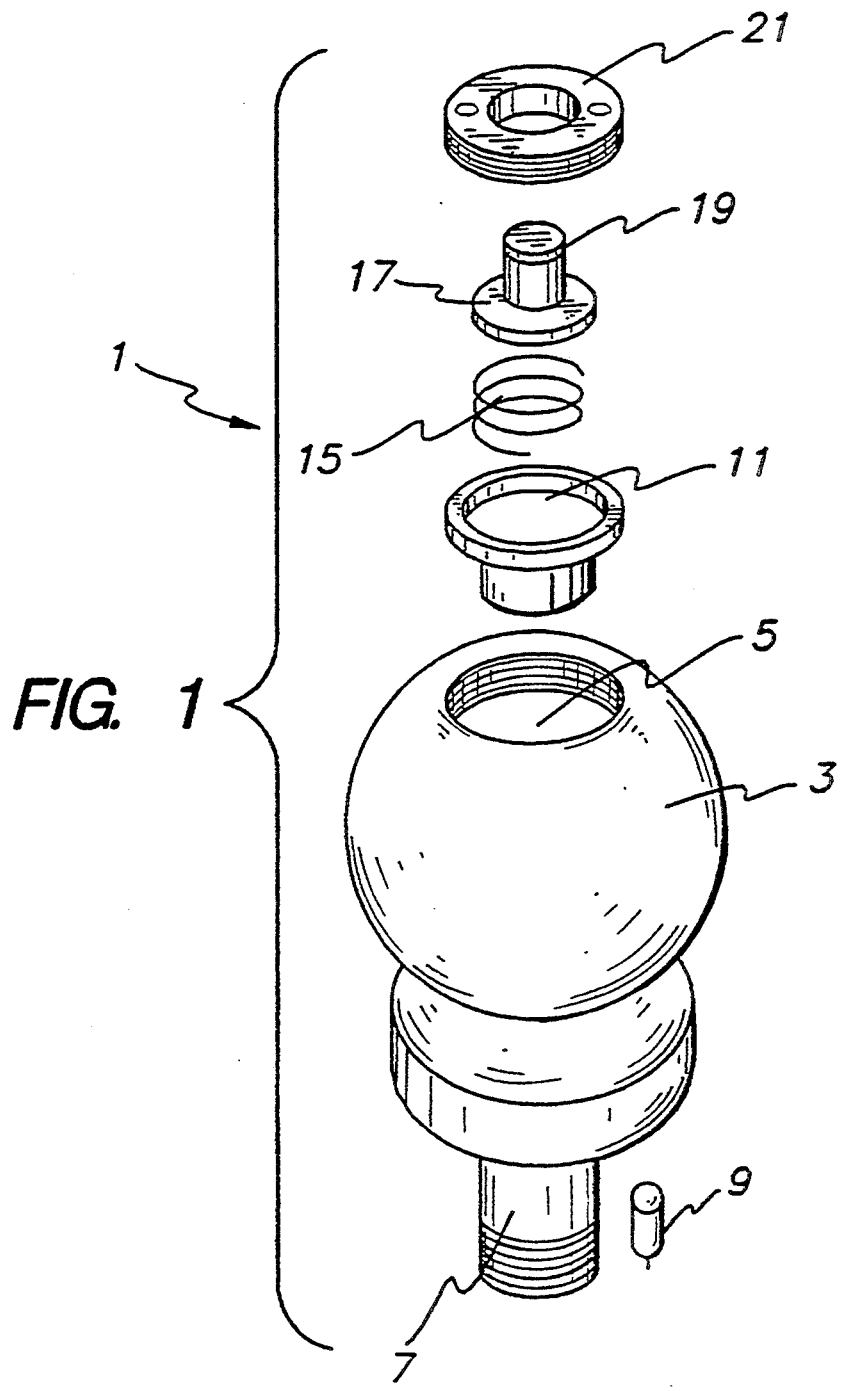
FIG. 1 shows an exploded view of a trailer ball according to the present invention.

FIG. 1 depicts an exploded view of the trailer ball assembly 1 according to the invention. The trailer ball 3 has a circular threaded opening 5 axially aligned with the threaded shank 7 by which the ball is secured to the towing vehicle (not shown). A loose ball sensor microswitch 9 is mounted on the underside of the ball assembly 1 and serves as a sensor to detect a loose connection between the ball assembly 1 and the towing vehicle.

Within the central bore of the trailer ball is mounted, coaxially with said threaded shank 7, a spring retainer and sensor switch mount 11 which houses a trailer sensor microswitch 13 which acts as a sensor to detect a loose coupling between the trailer ball 3 and the towing vehicle's socket. Mounted in the spring retainer 11 for reciprocal vertical movement in the central bore of the ball assembly 1 is a spring 15 and a sensing plunger 17 having a circular base and an integral cylindrical portion of a diameter smaller than that of the circular base. The cylindrical portion of the sensing plunger extends past the topmost surface of the trailer ball 3 so that a coupling of the socket to the ball will depress the plunger and activate the trailer sensor microswitch 13. Within an annular cavity in the cylindrical portion of the sensing plunger is an "O" ring 19 to seal, in conjunction with the threaded retainer 21, the central bore within the trailer ball 1 from the elements. The threaded retainer 21 is screwed in the circular threaded opening 5 of the trailer ball 3. A loose coupling between the trailer ball 1 of the vehicle and the socket (not shown) of the trailer will cause the spring 15 to force the sensing plunger 17 axially away from the spring retainer 11, actuating the trailer sensor microswitch 13. The trailer sensor microswitch 13 and the loose ball microswitch 9 are connected by suitable wiring (29 in FIG. 2) extending through the threaded shank 37 of the trailer ball 3 to a control circuit as described hereinbelow.

FIG. 2 shows a schematic of the circuit controlling the trailer hitch security system according to the present invention. The outline of the trailer ball 3 is depicted in phantom lines. Within the trailer ball 3 are the trailer sensor microswitch 13 and the ball sensor microswitch 9, connected by wiring 23. A two-part mating plug connector 25 connects the wiring 23 to the remainder of the control circuit. Optionally, for tandem hauling, an adaptor plug 27 may be inserted between the two portions of the mating plug connector 25. This allows for the connection a second trailer ball assembly (not shown) to the control circuit, and thus to the trailer hitch security system according to the present invention.

The control circuit is generally comprised of two main parts: the Auto Horn Module 29 and the Monitor Panel 31.

The Monitor Panel 31 draws its power from the vehicle's battery at the battery terminals 33. One terminal of a 3-ampere circuit breaker 35 is connected to the positive terminal of the battery 33, and the other-terminal of the circuit breaker 35 is connected to a power switch 37. The single contact of switch 37 is wired to one of the two terminals of the plug connector 25, to send current through the ball sensor microswitch 9, and through the trailer sensor microswitch 13. The return path of the current is through the other terminal of the plug connector 25, which is connected to power the 12-volt sensor relay 39.

Thus, as long as there is a secure coupling of the trailer's socket onto the vehicle's ball, and a secure connection between the ball and the vehicle's frame, microswitches 9 and 13 will be in their closed positions, and sensor relay 39 will be powered. Switch 41, controlled by sensor relay 39, has two contacts 43 and 45. If the trailer is not secure, switch 41 is controlled to connect with contact 43, and the red portion of a two color light emitting diode (LED) 47 will be illuminated, signifying that one of the sensor microswitches 9 or 13 is open. Additionally, if the trailer connection is not secure, the 12-volt acc relay 49 controls switch 51 to connect to contact 53, thus providing power to the buzzer 55, producing an audible alarm within the cab of the vehicle. The 12-volt acc relay 49 draws power from the accessory terminal 57 of the vehicle through a 1-ampere fuse 59. If the trailer is secure, switch 41 is controlled to connect with contact 45, which causes the green portion of the two color LED 47 to illuminate. Thus, in Driving Mode, if the trailer is secure, microswitches 9 and 13 will be in their closed position, and the green LED will be illuminated, because switch 41 will be controlled to connect to contact 45. If the trailer is not secure, however, the red LED will be illuminated, and switch 41 will be controlled to connect to contact 43, whereas switch 51 will be controlled to connect with contact 53, causing the buzzer to emit an audible alarm.

When the vehicle's ignition is turned off, the Park Mode is automatically activated, and switch 51 is controlled to connect with contact 61, which is wired to power a 10-ampere relay 63. Relay 63 controls the two-pole, single-throw switch 65. Switch 65 has a first pole with contacts 67 and 69, and a second pole with contacts 71 and 73. Contact 69 is wired to the vehicle's battery through the 3-ampere circuit breaker 35 if the power switch 37 is in its closed position. To enable the anti-theft alarm system, the monitor panel should be left in its "ON" position in the Park (anti-theft) Mode, by keeping switch 37 closed. Contact 61 of switch 51 is also connected to one terminal of a timer 75, the other terminal of the timer being wired to contact 67 of switch 65. Timer 75 controls the length of time the vehicle's horn is to blast should an unauthorized removal or theft of the trailer take place. Contact 73 of switch 65 is connected to a flasher unit 77, which causes the intermittent sounding of the vehicle's horn 79, or other loud alarm. The remaining contact of switch 65, contact 71, is wired to the vehicle's positive battery terminal through a 20-ampere circuit breaker 81.

Thus, in Park Mode, if the trailer is secure, switch 41 is controlled to connect to contact 45, switch 51 to contact 61 (as the acc relay is powered by the accessory terminal 57), and the two pole, single throw switch 65 is in its open position. If an unauthorized removal or theft of the trailer occurs, switch 65 closes because a current path to the switch has been established by switch 41 switching from contact 45 to contact 43, which then causes the vehicle's horn 79 to sound intermittently. The horn will sound until either the monitor panel power switch 37 is turned to its "OFF" (open position), which powers down the entire system, or the time set on the timer 75 elapses. Returning the trailer to the vehicle will not cancel the alarm. Preferably, switch 37 is located in the cab portion of the vehicle, so that only the owner of the vehicle may have access to it.

Modifications of the invention herein disclosed will occur to a person skilled in the art and all such modifications are deemed to be within the scope of the invention as defined by the appended claims.

What is claimed is:

1. A trailer hitch security system having a socket fixedly attached to a trailer and a ball assembly fixedly attached to a towing vehicle, said ball being adapted to be received by said trailer socket so as to allow said trailer to pivot with respect to said towing vehicle, comprising:
   (a) first sensor means for detecting a loose coupling between said trailer socket and said ball assembly;
   (b) second sensor means for detecting a loose coupling between said ball assembly and a frame of said towing vehicle on which said ball assembly is mounted;
   (c) first visual indicator means responsive to said first and second sensor means, said first visual indicator means being energized in response to a proper coupling of said trailer with said towing vehicle and a proper coupling of said ball assembly with said frame;
   (d) second visual indicator means responsive to said first and second sensor means, said second visual indicator means being energized in response to a detected faulty coupling between either said trailer and said towing vehicle or between said ball assembly and said frame;
   (e) first audible alarm means responsive to said first and second sensor means, said first audible alarm means being energized in response to a detected faulty coupling between either said trailer and said towing vehicle or between said ball assembly and said frame;
   (f) second audible alarm means responsive to said first and second sensor means, said second audible alarm means being energized in response to an unauthorized uncoupling of said trailer from said towing vehicle when said vehicle's ignition has been turned off;
   (g) means for causing said second audible alarm means to continue to be activated in the event that said trailer is recoupled to said vehicle after an unauthorized uncoupling; and
   (h) switch means for deactivating said second audible alarm means only from within said vehicle.

2. A trailer hitch security system according to claim 1 wherein said ball assembly has a spherical part, a cylindrical bas,e and a threaded shank part and comprises:
   (a) a circular threaded opening axially aligned with said threaded shank;
   (b) a sensing plunger mounted for reciprocal movement within a central bore formed vertically in said ball assembly, said sensing plunger having a cylindrical portion integral with a circular base;
   (c) an "O" ring mounted within an annular cavity in said cylindrical portion of said sensing plunger;
   (d) a spring mounted in said central bore forcing said sensing plunger to extend past an uppermost top surface of said ball;
   (e) a spring retainer and switch mount providing support for said spring and said sensing plunger and further housing said first sensing means;
   (f) a threaded retainer screwed onto said circular threaded opening to seal said central bore from the elements in conjunction with said "O" ring of said sensing plunger; and
   (g) a chamber in the base of said ball for mounting said second sensing means.

3. A trailer hitch security system according to claim 1, wherein said first audible alarm means is a low volume buzzer located in a cab portion of said towing vehicle to alert an operator of said vehicle that the trailer hitch is faulty.

4. A trailer hitch security system according to claim 1, wherein said second alarm system is the vehicle's horn.

5. A trailer hitch security system according to claim 1, wherein said second audible alarm means is intermittently energized by a flasher circuit.

6. A trailer hitch security system according to claim 1, wherein said first and second sensor means are connected to a power supply means via a two part connector plug between which an adaptor plug may be inserted for connecting a second ball assembly to allow the trailer hitch security system to operate with two trailers connected thereto.

7. A trailer hitch security system according to claim 1, wherein said first and second visual indicator means are a single dual color light emitting diode.

8. A trailer hitch security system according to claim wherein both of said first and second visual indicator means of said dual color light emitting diode are energized in response to a first relay controlled switch, said first relay being responsive to said first and second sensor means.

9. A trailer hitch security system according to claim 1, wherein said second audible alarm means is automatically set to be energized whenever the vehicle's ignition is turned off and an unauthorized uncoupling of the trailer hitch occurs.

10. A trailer hitch security system according to claim 1, further comprising timing means adapted to interrupt power supplied to said second audible alarm means after a preset period of time has elapsed, thereby causing said second alarm means to become deactivated.

11. A trailer hitch security system according to claim 10, wherein said timing means and said second audible alarm means are energized by closing a first relay controlled two pole, single throw switch, thereby connecting said timing means and said second audible alarm means to a power supply, each through an appropriate circuit breaker.

12. A trailer hitch security system according to claim 11, wherein said second relay controlling said two pole, single throw switch is itself controlled by second relay controlled switch controlled to switch upon the vehicle's ignition being turned off.

* * * * *